June 2, 1959     M. O. KALLEBERG     2,889,038

DOUBLE-COATED PRESSURE-SENSITIVE ADHESIVE TAPE

Filed July 5, 1956

FIG. 1

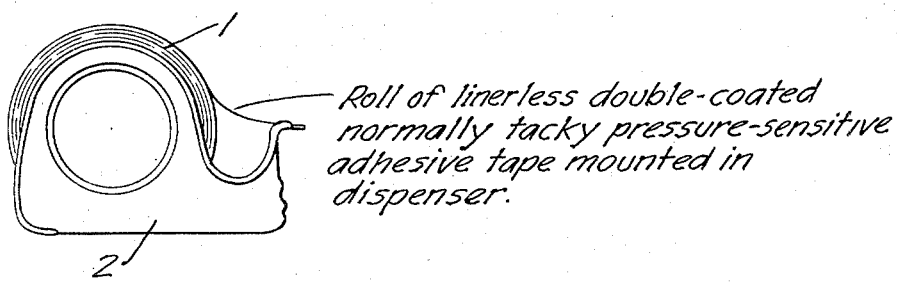

Roll of linerless double-coated normally tacky pressure-sensitive adhesive tape mounted in dispenser.

FIG. 2

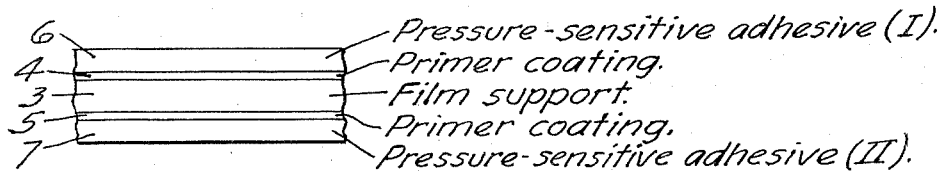

Pressure-sensitive adhesive (I).
Primer coating.
Film support.
Primer coating.
Pressure-sensitive adhesive (II).

Adhesives (I) and (II) are chemically different and physically incompatible so tape can be readily unwound from roll despite direct contact of tacky adhesive layers.

INVENTOR
MELVIN O. KALLEBERG
BY
Carpenter, Abbott, Coulter & Kinney
ATTORNEYS

United States Patent Office 2,889,038
Patented June 2, 1959

2,889,038

DOUBLE-COATED PRESSURE-SENSITIVE ADHESIVE TAPE

Melvin O. Kalleberg, Minneapolis, Minn., assignor to Minnesota Mining and Manufacturing Company, St. Paul, Minn., a corporation of Delaware Application July 5, 1956, Serial No. 596,007

3 Claims. (Cl. 206—59)

This invention relates to double-coated adhesive tape that is normally tacky and pressure-sensitive on both sides and which can be wound directly upon itself, without a liner or separator, to provide rolls of tape that are manufactured, sold and used.

Surprisingly, I have discovered that it is possible to manufacture rolls of such tape which even after long standing can be readily unwound without delamination or offsetting of adhesive, a clean separation occurring at the interface of the mutually contacting back and front adhesive surfaces in the wound roll. This is amazing to the uninitiated since both sides of the adhesive tape are normally and aggressively tacky and readily and tenaciously adhere upon contact with dissimilar surfaces such as glass, metal, wood and paper, and they adhere to each other in the wound roll of tape so that substantial force is needed in unwinding tape. It would be expected that the adhesive surfaces would invariably block together in the roll so as to render impossible the unwinding of tape to effect a clean separation of the original surfaces that were brought into adhesive contact when the roll was initially wound.

I have found that it is possible to select combinations of different adhesives which permit of achieving this unexpected result and in a commercially satisfactory manner. Use is made of front and back adhesive coatings that are chemically different and physically incompatible. The result is due to inherent characteristics of the adhesives and utility can be determined without actually making up rolls of tape, by means of tests that permit preselection of suitable pairs of different adhesives for use in manufacturing adhesive tapes.

Pressure-sensitive adhesive tape that is tacky on both faces—as distinguished from conventional tape having a backing coated only on one face with adhesive—has long been known to the trade. Such pressure-sensitive adhesive tapes are commonly known as double-coated tape. When supplied in roll form they are provided with an interwound liner strip that covers the back adhesive and prevents blocking together of the front and back adhesive surfaces that would otherwise contact each other in the roll. Absent the liner, these prior rolls of double-coated tape would unify into a solid mass that could not be unwound at all or in the desired manner.

An obvious advantage of the present linerless double-coated pressure-sensitive adhesive tape is that the tape can be removed from the roll and used without the bother of peeling a liner from the tape. And economy results from avoiding the added cost of a liner.

Another advantage is that the present tape rolls can be mounted in the well-known regular manual tape dispensers commonly used for holding and dispensing ordinary single-coated pressure-sensitive tapes (such as the widely used cellophane tapes). There is no liner to get in the way and to interfere with the severing of the tape and with the retention of the newly formed tip portion on the holding surface which it contacts. A piece of the present tape is readily obtained in desired length from the dispenser by grasping the tip portion between the fingers, pulling out the desired length, and severing the tape against the serrated cutting edge. The tape can also be dispensed from mechanical dispensers which eject a piece of tape drawn from the roll.

Double-coated pressure-sensitive adhesive tape has many uses in factories, offices, homes and schools. It is often employed as a substitute for glue in fastening papers together, for mounting photographs and clippings in albums, etc. A piece of the tape may be adhered against the back surface of a paper that is to be mounted, which is then pressed against the base surface; the two surfaces thus becoming strongly bonded together by the intervening thin strip of tape in a convenient dry manner. A more widespread usage of this expedient is facilitated by the present invention since it makes available a double-coated tape that can be employed in ordinary tape dispensers of the throw-away and refillable types.

The invention is illustrated in the accompanying drawing wherein:

Fig. 1 shows a roll of the linerless double-coated pressure-sensitive adhesive tape 1 mounted in a conventional dispenser 2; and Fig. 2 shows in enlarged diagrammatic fashion an edge view of a tape having a film support 3, such as cellophane, which is coated on both faces by means of back and front primer coatings 4 and 5 and overlying back (I) and front (II) pressure-sensitive adhesive coatings 6 and 7, the primer coatings serving to bond the respective adhesive coatings more firmly to the film support than otherwise would be the case. The two adhesive coatings, designated (I) and (II) in the figure, are chemically different and physically incompatible, preventing blocking of the tape when directly wound upon itself and permitting ready unwinding to effect a clean separation at the interface of the original adhesive coatings.

One or both of the primer coatings can be omitted when not found necessary and priming can be dispensed with when the adhesives are coated on a porous or fibrous support. When the adhesives differ materially in degree of tackiness to the skin, it is generally preferable that the least tacky of the pair be used as the back adhesive (I), by which is meant the adhesive that is on the back or outer face of the tape as wound in the roll. The reason is that when a piece of tape is removed and applied face down upon a surface, the pressing finger can be more readily pulled free without pulling the tape from the surface (which contacts the tackier front adhesive).

The use of a thin flexible film support as the central lamina of the structure is generally preferred as it makes possible a particularly thin adhesive tape product having a uniform thickness and smooth adhesive surfaces, for instance a tape having a total thickness of 4 mils or less, which is advantageous in fastening and mounting papers. Such films also permit of making a clear transparent adhesive tape. However, other flexible supporting strips can be used when desired, such as papers, tissues, woven and nonwoven fabrics, metal foils, etc.

Pressure-sensitive tape adhesives commonly have a rubbery base of natural or synthetic rubbery polymer which provides cohesion (internal strength) and elasticity (a retractive force when stretched and retraction when released after stretching); and this rubbery base is modified (as by blending with a compatible tackifier resin) to increase adhesion (tackiness) and decrease cohesion, with an attendant increase of stretchiness (elongation under low stresses) and decrease of elasticity. These rubbery-base pressure-sensitive adhesives are aggressively tacky in their normal dry form on the tape and have a proper four-fold balance of adhesion, cohesion, stretchiness and elasticity, which permits adhesive tape coated therewith to firmly adhere on mere contact and with finger pressing, and yet to be stripped back from smooth surfaces to which temporarily applied without delamination or off-setting of adhesive. The tape can be handled without gumming the fingers or leaving a residue. Certain synthetic polymers and copolymers (e.g., certain polyvinyl ethers and polyacrylates) have a molecular structure such that they inherently have the desired tacky rubbery properties permitting of use, without addition of a tackifying material, as rubbery-base pressure-sensitive tape adhesives.

A great variety of pressure-sensitive tape adhesive compositions have been employed in commercial practice and many others have been described in patents and publications. The present invention does not require the use of novel adhesives but involves the use in combination of a selected pair of different adhesives, which may individually be old or new. It is my discovery that selection can be made of a pair of chemically different and physically incompatible adhesives to obtain the presently desired result. A variety of such pairs can be selected from among previously known pressure-sensitive tape adhesive materials. Clear transparent adhesives are used in making transparent tapes that are relatively "invisible" when applied to a surface, but colored adhesives that are transparent or opaque can be employed when desired.

Not all adhesives that are chemically different are physically incompatible, by which it is meant that superimposed layers of the adhesives will not merge or blend together even upon prolonged contact. They adhere but do not cohere and unify.

A convenient test that can be employed in making selections of suitable pairs of incompatible adhesives is the following: An anodized aluminum panel (say 6" x 12") is used as a coating base. A solution of one adhesive in the usual volatile solvent (as employed in coating a tape backing) is poured along one edge of the panel while in a horizontal position. The panel is then tilted to an angle of about 80° with the adhesive-carrying edge uppermost, allowing the viscid adhesive solution to flow out into a uniform thin film and the excess to drain from the lower edge. With this adhesive coating still in a wet (undried) condition, the procedure is repeated using a solution of the second adhesive, thereby superimposing a coating of the second adhesive upon the first. The coatings are dried at room temperature for 24 hours to evaporate the solvents. Then a series of ordinary cellophane-backed pressure-sensitive adhesive tape strips are applied in shoulder to shoulder relation and pressed down with a rubber-covered roller. These tapes are stripped back and removed at intervals to determine the effect of more prolonged contact between the adhesive coatings on the panel. A pair of adhesive coatings which separate at the interface under the delaminating force exerted by the tape strip when removed (the tape pulling away the underlying top adhesive coating with the bottom coating being held by the porous anodized surface of the test panel) are thereby demonstrated as being physically incompatible. In some instances a false indication will be given when separation is effected promptly after the tape has been applied, because insufficient time has elapsed for blocking (cohesion) to occur. That is why a series of tapes are employed, so that the effect of prolonged contact can be observed. While it may not be safe to depend upon a single test made immediately or even a day after the tapes have been applied, experience indicates that a test made at the end of a week can be relied upon to demonstrate physical incompatibility of the adhesives. Hence it appears that the use of this procedure in selecting a suitable pair of incompatible adhesives can be simplified if desired by merely applying a single tape (after drying of the adhesive coatings) and stripping it off at the end of a week.

*Example 1*

This example illustrates the making of rolls of linerless double-coated pressure-sensitive adhesive tape in accord with the present invention.

A web of cellophane tape backing was primed on one side by coating with an aqueous emulsion of polyvinyl alcohol and Buna S (GR-S) latex followed by passing over steam-heated drums under tension to dry the primer coating without warping or wrinkling the cellophane (cf., U.S. Patent No. 2,328,057 issued August 31, 1943).

The web was then coated on the primed side with a solution in heptane solvent of pressure-sensitive adhesive composition having the following ingredients (parts by weight):

| | Parts |
|---|---|
| Rubbery polyisobutylene (such as "Vistanex B 120") | 100 |
| Low molecular weight tacky polyisobutylene (such as "Vistac A 70") | 70 |
| Pure hydrocarbon terpene tackifier resin (such as "Piccolyte S 85") | 45 |
| Rosin ester tackifier resin (such as "Hercolyn") | 30 |
| Di-tert.-amyl hydroquinone (antioxidant) (such as "Santovar A") | 1.1 |

The coated web was dried by passing through an oven to eliminate the solvent and was wound in a jumbo roll with the coated side on the inside.

The web was unwound from the jumbo roll and coated on the previously uncoated side with a solution of a copolymer of isoamyl acrylate and acrylic acid (90:10 ratio by weight), followed by drying and winding in a jumbo roll with this second-applied pressure-sensitive adhesive coating on the inside. The solution of the copolymer had been prepared by mixing 550 parts by weight of ethyl acetate solvent, 270 parts of isoamyl acrylate monomer and 30 parts of acrylic acid, with 2 parts of benzoyl peroxide catalyst being added in four portions over a ten hour period during which the temperature was held at 55° C. Polymerization was largely completed at this point but heating was continued at about 60° C. for an additional hour to provide a viscous solution containing about 35% non-volatile solids. This was diluted to 20% non-volatiles by adding heptane, providing a solution of coatable viscosity.

The double-coated web was unwound from the jumbo roll and slit and wound into rolls of desired size, in such manner that the primed first-coated side was on the inside. Thus the first-mentioned pressure-sensitive adhesive (polyisobutylene type) provided the front or face-side adhesive coating in the finished tape roll, while the acrylate type adhesive (which is less tacky) provided the back adhesive coating.

The following table lists further illustrative pairs of pressure-sensitive tape adhesive that can be employed in practicing the invention:

| Example | First adhesive | Second adhesive |
|---|---|---|
| 2 | Same as polyisobutylene adhesive of Example 1. | Methyl isoamyl acrylate polymer. |
| 3 | ----do---- | Copolymer of fusel oil acrylate [1] and methyl isoamyl acrylate (50:50). |
| 4 | ----do---- | Polyvinyl ethyl ether. |
| 5 | Copolymer of fusel oil acrylate [1] and methyl isoamyl acrylate (50:50). | Copolymer of fusel oil acrylate [1] and acrylic acid (90:10). |
| 6 | ----do---- | Mixture of 160 parts of polypropylene glycol (M.W. of 425) and 100 parts polyacrylic acid. |

[1] "Fusel oil acrylate" designates the mixture of acrylate esters of the alcohols contained in fusel oil, which has a variable composition lying within the approximate limits of 55-80% primary amyl alcohols, 15-45% primary butyl alcohols and 0-5% n-propyl alcohol, as determined by analysis.

The invention is not limited to linerless double-coated adhesive tape wound upon itself, although this is the embodiment of chief present interest and accordingly has been described in some detail. The principle may also be utilized, for example, in providing stacks or packs of double-coated adhesive tape in the form of strips or sheets which are superimposed without interposed liners or separators, the mutually contacting adhesive layers of different kinds being separable at the interfaces when the successive strips or sheets are peeled off for use. These may be provided with non-adhesive tabs to facilitate grasping.

I claim:

1. A linerless double-coated pressure-sensitive adhesive tape wound directly upon itself in roll form, comprising a flexible support coated on each of the front and back sides with respectively different rubbery-base pressure-sensitive adhesives each of which is aggressively tacky in its normal dry form so as to readily and tenaciously adhere upon contact with dissimilar surfaces such as glass, metal, wood and paper and so as to enable use of the tape as a substitute for glue in fastening papers together and mounting photographs and clippings in albums, the adhesive coatings adhering to each other in the wound roll so that substantial force is needed in unwinding tape therefrom; the respective rubbery-base pressure-sensitive adhesives being selected so as to be chemically different and physically incompatible such that they will separate at the interface therebetween and the adhesive tape can be readily unwound from the roll without delamination or offsetting of adhesive.

2. A linerless transparent double-coated pressure-sensitive adhesive tape wound directly upon itself in roll form, comprising a transparent flexible film support coated on each of the front and back sides with respectively different transparent rubbery-base pressure-sensitive adhesives each of which is aggressively tacky in its normal dry form so as to readily and tenaciously adhere upon contact with dissimilar surfaces such as glass, metal, wood and paper and so as to enable use of the tape as a substitute for glue in fastening papers together and mounting photographs and clippings in albums, the adhesive coatings adhering to each other in the wound roll so that substantial force is needed in unwinding tape therefrom; the tape having a thickness not exceeding 4 mils; the respective rubbery-base pressure-sensitive adhesives being selected so as to be chemically different and physically incompatible such that they will separate at the interface therebetween and the adhesive tape can be readily unwound from the roll without delamination or offsetting of adhesive.

3. A transparent pressure-sensitive adhesive tape according to claim 2 wherein at least one of the pressure-sensitive adhesive coatings is bonded to the film support by an interposed primer coating serving to bond the adhesive more firmly thereto than otherwise would be the case.

References Cited in the file of this patent

UNITED STATES PATENTS

| | | |
|---|---|---|
| D. 144,865 | Mason | May 28, 1946 |
| 2,529,060 | Trillich | Nov. 7, 1950 |
| 2,556,078 | Francis | June 5, 1951 |
| 2,607,711 | Hendricks | Aug. 19, 1952 |
| 2,803,560 | McIntyre et al. | Aug. 20, 1957 |

FOREIGN PATENTS

| | | |
|---|---|---|
| 878,142 | France | Sept. 28, 1942 |